(12) United States Patent
Mattson et al.

(10) Patent No.: US 8,051,223 B1
(45) Date of Patent: Nov. 1, 2011

(54) SYSTEM AND METHOD FOR MANAGING MEMORY USING MULTI-STATE BUFFER REPRESENTATIONS

(75) Inventors: Peter Mattson, Sunnyvale, CA (US); David Goodwin, Los Altos, CA (US)

(73) Assignee: Calos Fund Limited Liability Company, Dover, DE (US)

( * ) Notice: Subject to any disclaimer, the term of this patent is extended or adjusted under 35 U.S.C. 154(b) by 81 days.

(21) Appl. No.: 12/331,348

(22) Filed: Dec. 9, 2008

(51) Int. Cl.
*G06F 13/28* (2006.01)
(52) U.S. Cl. .............. 710/28; 710/22; 710/23; 711/117; 711/118; 711/124; 713/375
(58) Field of Classification Search ................... None
See application file for complete search history.

(56) References Cited

U.S. PATENT DOCUMENTS

| 5,517,636 | A  | * | 5/1996 | DeHart et al. ............... 709/240 |
| 7,167,934 | B1 | * | 1/2007 | Dunn et al. .................. 710/52 |
| 2007/0073924 | A1 | * | 3/2007 | Kuroki et al. ................ 710/22 |
| 2008/0104328 | A1 | * | 5/2008 | Yoshikawa et al. .......... 711/137 |

* cited by examiner

*Primary Examiner* — Eron J Sorrell

(57) ABSTRACT

In an embodiment, buffer constructs may be generated to be associated with any one of multiple mutually exclusive states, including an open state and a closed state. When the buffer construct is in the closed state, the region of memory represented by the buffer construct is made accessible to one or more direct memory access (DMA) operations. Upon completion of the one or more DMA operations, the buffer construct transitions from the closed state to the open state. The region of memory represented by the buffer construct is made accessible for use with one or more cache operations when the buffer construct is in the open state, so that the one or more cache operations are not in conflict with the one or more DMA operations.

17 Claims, 5 Drawing Sheets

SYSTEM AND METHOD FOR MANAGING MEMORY USING MULTI-STATE BUFFER REPRESENTATIONS

TECHNICAL FIELD

The disclosed embodiments relate to a system and method that manage memory. More particularly, the disclosed embodiments relate to a system and method for managing memory using multiple state buffer representations.

BACKGROUND

High-performance processors often access the same data multiple ways, such as through a cache and through direct memory access (DMA). A cache is typically used for irregular control, such as deciding how to encode the next frame of video. DMA is typically used for high-performance computation, such as encoding the next frame.

Accessing the same memory multiple ways presents synchronization requirements. For example, any data stored in the cache must be flushed before it can be accessed with DMA. Any DMA operations, which execute asynchronously from the control thread for performance reasons, must complete before the data can be accessed through the cache.

Existing solutions typically depend on explicit function calls to flush the cache, wait for a DMA call to complete, or perform other synchronization tasks. Unfortunately, an application will compile and run if the synchronization calls are omitted. The missing calls result in hard to diagnose bugs. For example, a programmer might write code that initializes an array using a cached pointer, then loads part of the array using DMA, while forgetting an intervening call to flush the cache. The code would compile and run. However, the DMA access would not see the cached changes, resulting in incorrect results from otherwise correct code.

Further, synchronization with respect to asynchronous DMA is hard to express. It may be oversimplified such that a DMA function call blocks (does not return until the DMA is done) or requires a barrier later (which waits for all DMA calls, not just the needed call). Either simplification diminishes performance. Alternatively, the synchronization may be expressed in a complicated manner in which the user has to track and indicate which DMA operations to wait for.

DETAILED DESCRIPTION

Figure 1:
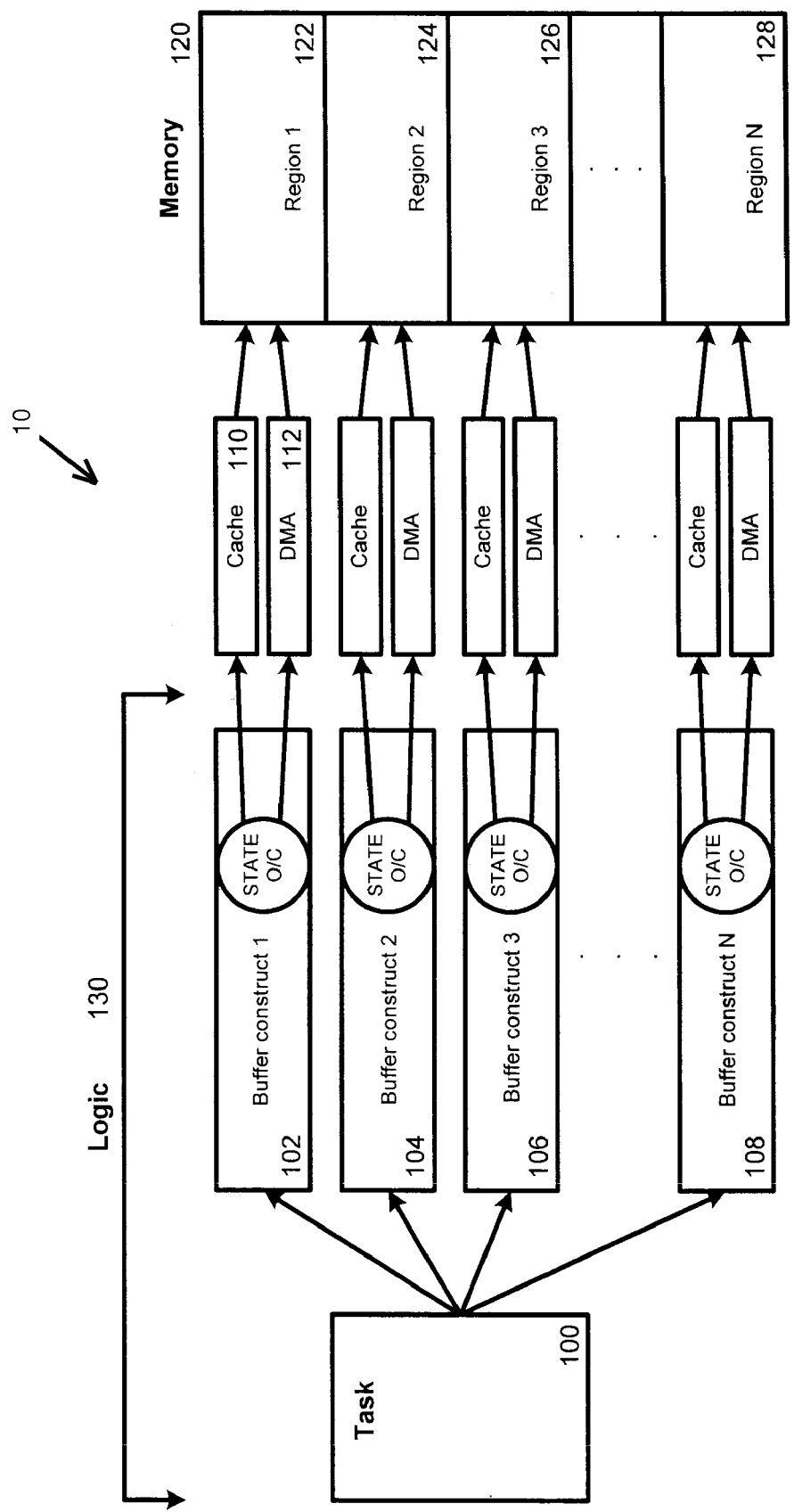
FIG. 1 illustrates a system for managing memory using a mufti-state buffer construct that represents a region of memory, according to an embodiment.

According to an embodiment, a buffer construct is programmatically created to represent a region of memory. The buffer construct may correspond to a data structure that includes pointers or address information to a represented region of memory. The represented region of memory may be external to locations where processing resources are to take place. As described, the buffer construct may be implemented as a required element for a task or component to perform an operation that accesses either actual data in a represented region of memory, or cached data provided in an associated cache region of that memory. As such, embodiments described herein manage memory resources in systems that mix direct memory access (DMA) operations with alternative memory access operations, such as cache retrievals. Furthermore, embodiments provide that the buffer construct includes state information that precludes the buffer construct from being accessed when conflict may arise between the content of the represented region of memory (which is altered by DMA operations) as compared to the content of the cached representation of that region (cache operations).

In an embodiment, buffer constructs are generated and associated with any one of multiple mutually exclusive states, including an open state and a closed state. When the buffer construct is in the closed state, the region of memory represented by the buffer construct is made accessible to one or more direct memory access (DMA) operations. Upon completion of the one or more DMA operations, the buffer construct transitions from the closed state to the open state. The region of memory represented by the buffer construct is made accessible for use with one or more cache operations when the buffer construct is in the open state, so that the one or more cache operations are not in conflict with the one or more DMA operations.

The nomenclature associated with identifying a particular state is actually arbitrary. Thus, for example, the 'open' and 'closed' states of the buffer construct may alternatively be called 'first' or 'second' states.

According to another embodiment, a system is provided for managing memory resources in a computing environment where DMA operations take place. The memory resources may include an external memory, a cache, and a memory resource that is local to at least a portion of the processing resources. The first processing resource is configured to (i) execute at least a first task, and (ii) create a buffer construct with execution of the first task, wherein the buffer construct includes a data structure that has pointers to a region of memory in the memory resources. The processing resources are configured to assign state information to the buffer construct, and to control the task in using the state information. In particular, the state information is configured to be determinative as to whether (i) the task is enabled to perform direct memory access operations using the external memory while precluding use of the cache, or (ii) the task is enabled to perform cache operations to the cache while precluding use of the external memory.

As used herein, the terms "programmatic", "programmatically" or variations thereof mean through execution of code, programming or other logic. A programmatic action may be performed with software, firmware or hardware, and generally without user-intervention, albeit not necessarily automatically, as the action may be manually triggered.

One or more embodiments described herein may be implemented using programmatic elements, often referred to as modules or components, although other names may be used. Such programmatic elements may include a program, a subroutine, a portion of a program, or a software component or a hardware component capable of performing one or more stated tasks or functions. As used herein, a module or component, can exist on a hardware component independently of other modules/components or a module/component can be a shared element or process of other modules/components, programs or machines. A module or component may reside on one machine, such as on a client or on a server, or a module/component may be distributed amongst multiple machines, such as on multiple clients or server machines. Any system described may be implemented in whole or in part on a server, or as part of a network service. Alternatively, a system such as described herein may be implemented on a local computer or terminal, in whole or in part. In either case, implementation of system provided for in this application may require use of memory, processors and network resources (including data ports, and signal lines (optical, electrical etc.), unless stated otherwise.

Furthermore, one or more embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g., mobile devices such as cell phones) are all examples of machines and devices that utilize processors, memory, and instructions stored on computer-readable mediums.

System Architecture

FIG. 1 illustrates a system 10 for managing memory using a mufti-state buffer construct representation of a region of memory, according to an embodiment. A system includes memory 120 and logic 130 to create and use buffer constructs 102-108. The buffer constructs 102-108 include data that identifies or points to specific portions of memory 120. These portions may be identified by memory addresses, which are represented by pointers or similar data in corresponding buffer constructs. Additionally, one or more embodiments provide that the buffer constructs include state information, which serves to identify an operative state of the represented portion of memory (e.g., open or closed for direct memory access). More particularly, the state information may control whether cache is to be accessed over memory, or vice-versa, in part by using state information that defines the operative state of the memory (open or closed). In an operative environment, the buffer constructs 102-108 are generated by logic 130, as implemented in the execution of individual tasks. By using buffer constructs that include state information as mechanism to control access to regions of memory 120, system 10 manages memory use to minimize potential coherency issues that may arise between cache (or virtualized memory) and the corresponding memory source.

In an embodiment, a program executes one or more tasks that are structured to implement buffer constructs in a manner such as described. In one implementation, logic 130 is functionally incorporated with the run-time execution of a task. As an alternative or addition, the logic 130 may be distributed or included with individual buffer constructs. FIG. 1 depicts task 100 which, for purpose of description, is representative of other tasks that may be executed to include features such as those described herein. The task 100 corresponds to execution of a high-level programming function that incorporates one or more low-level operations, including memory-access operations. For example, in the field of video processing, a task may correspond to a set of instructions for capturing a video frame, for decoding or encoding the video frame, or for enhancing the video frame.

In an embodiment, memory 120 is allocated into different regions, referenced in FIG. 1 as Region 1 122, Region 2 124, Region 3 126 and Region N 128. At run time, the task 100 (or logic 130 distributed elsewhere) creates individual buffer constructs that represent each memory region 122-128. In one embodiment, buffer construct 1 102 includes a set of pointers to Region 1 122, buffer construct 2 104 includes a set of pointers to Region 2 124, buffer construct 3 106 includes a set of pointers to Region 3 126 and buffer construct N 108 includes a set of pointers to Region N 128.

According to an embodiment, each buffer construct includes state information. At any given run-time instance (i.e., when task 100 is being performed), the buffer constructs may be assigned to one of multiple mutually exclusive states. Each mutually exclusive state may be defined by the state information, where each mutually exclusive state may enable one type of memory access operation at the expense of precluding other types of operations. In particular, one embodiment provides for state information that is determinative of whether the buffer construct (and hence, the memory access operation) accesses cache (relatively close memory to the processing resource) or external memory (e.g., DRAM, off-chip memory, etc.).

Still further, the state information may define other states. In one implementation, the state information may also define a state that is determinative of whether other types of memory access operations are enabled or precluded. For example, as an alternative or addition, an embodiment provides for state information that is determinative of whether the task has completed a DMA operation. In such instances, the state information enables or precludes the task 100 from sending the buffer construct to another task. Other types of states may also be incorporated into the state information of the buffer construct.

According to one embodiment, each buffer construct has either an open state or a closed state at any given instance in its creation. When a buffer construct is in an open state, the task 100 is enabled to perform a cache operation, but is not enabled to access the region of memory through DMA operations. When the buffer construct is in a closed state, the task 100 is enabled to access the memory through DMA operation, but is not enabled to access the region of memory through cache operations. In this manner, the task 100 (or other counterparts) may execute both cache and DMA operations while minimizing the potential for conflict between the data carried in the cache as opposed to an external memory of the DMA operations.

With reference to FIG. 1, the task 100 executes to use buffer constructs in order to perform cache or DMA operations. The state information of the buffer construct is determinative of whether the task 100 is capable of performing the desired cache or DMA operation. More specifically, when the buffer construct 1 102 (representative of Region 1 122) is in the open state, cache operation 110 is enabled for Region 1 122. When buffer construct 1 102 is in the closed state, task 100 is enabled to execute a DMA operation 112. As mentioned, the buffer construct contains state information that identifies the buffer state—specifically as to whether the buffer construct is in the open state (to enable cache operation) or closed state (to enable DMA operations).

In one embodiment, multiple tasks may execute concurrently. When two or more tasks are performed concurrently, each task has start and end times which at least partially overlap. Thus, concurrently performed tasks are not necessarily performed simultaneously (although they may be in some instances and/or hardware implementations). To the contrary, in some hardware architectures encompassed by one or more embodiments, concurrently performed tasks may be performed one at a time. One or more embodiments recognize that in many operating environments, task 100 may require access to the memory 120 via either cache or DMA operation. Absent measures such as described by one or more embodiments, the ability of task 100 to use both cache and DMA operations may result in a conflict of content carried by the cache and the memory region represented by the buffer constructs. Accordingly, the buffer constructs are configured to include state information that precludes the represented region of memory from being accessed with DMA operations when cache operations are in conflict.

Figure 2B:
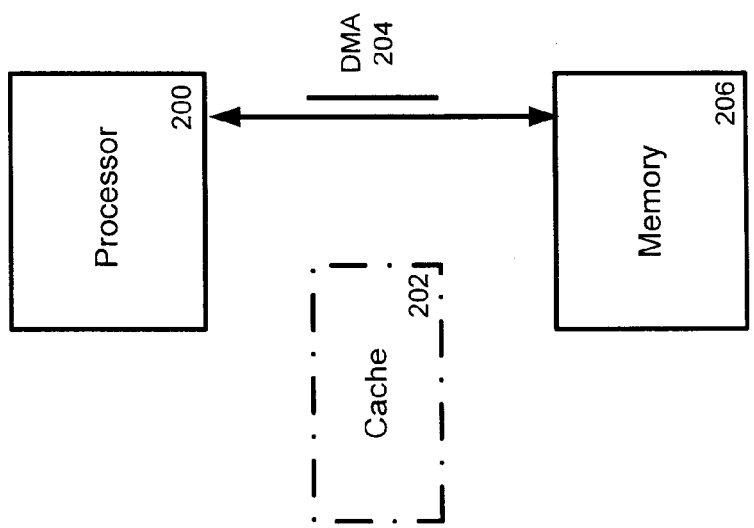
FIG. 2A and FIG. 2B illustrate use of state information to control access operations for cache or for performance of direct memory access operations, according to one or more embodiments.
Figure 2A:
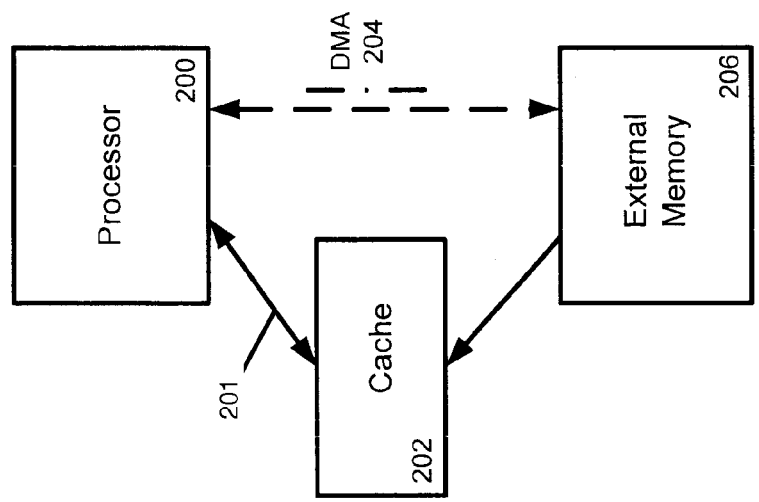

FIG. 2A and FIG. 2B illustrate use of state information to control access operations for cache or for performance of direct memory access operations, according to one or more embodiments. FIG. 2A is representative of a scenario in which state information is used to enable cache operations at an instance when there is no conflict with a previously performed or initiated DMA operation. As mentioned with other embodiments, such state information may be incorporated with a data structure or item such as the buffer construct, which includes pointers to enable use of the cache. In FIG. 2A, processor 200 has the ability to initiate memory access operations via access to cache 202 or external memory 206. The cache 202 may store (and maintain) a copy of data that is provided on a region of the external memory 206. The cache 202 is structured to copy data from a portion of the region of memory that is represented by the buffer construct. Thus, the buffer construct is also representative of the cache. To access external memory 206, DMA operations 204 may be initiated by the task that executes on the processor 200. To access the cache 202, the task may execute a cache retrieval 201, which typically provides relatively fast but limited access to a copy of the 'true' data that resides in the region of external memory. With reference to the buffer construct depicted with, for example, an embodiment of FIG. 1, the task of the processor may be configured to require use of the buffer construct in order to perform either of the cache retrieval 201 or DMA operation 204. The state assignment of the buffer construct is depicted as 'open', corresponding to the state in which the cache retrieval 201 can be performed without conflict of, for example, just prior performed DMA operations 204. In the open state, the DMA operations are precluded (and thus shown in phantom lines).

FIG. 2B is representative of a scenario in which state information is used to enable DMA operations to access external memory at an instance when there is no conflict with a previously initiated or performed cache operation. As described with one or more embodiments, the state information may be incorporated into the buffer construct. For example, the buffer construct may be assigned to 'closed' in order to enable DMA operations, and to preclude cache operations (avoiding conflict). As mentioned with FIG. 2A, the cache 202 may store (and maintain) a copy of data that is provided on a region of the external memory 206. To access external memory 206, DMA operations 204 may be initiated by the task that executes on the processor 200. To access the external memory 206, the task may execute DMA operations 204. The state assignment of the buffer construct is depicted as 'closed', corresponding to the state in which the DMA operations 204 can be performed without conflict of, for example, just prior performed cache operations 202. In the closed state, the cache operations 202 are precluded (and thus shown in phantom lines).

The following may provide an illustrative example of how one or more embodiments may be implemented. A task may be created for a video processing application. The task may execute to perform some video processing function, such as encoding or enhancement. In order to perform the function, the task may need to perform several operations, including reading data from memory or cache. Because the video data is a large amount of data, data intensive operations may require use of DMA operations to move data to and from an external memory while leveraging local processing resources. With reference to FIG. 2A and FIG. 2B, such DMA operations may require transition of the buffer construct into the closed state. In many instances, the operations may be reserved for relatively light-data intensity operations. As an example, a system may be implemented in which a particular task is to execute an operation to add a logo or overlay to a video frame. The act of adding a logo does not require use of the entire video frame, thus the cache may provide a more suitable source for data to perform the operation. To enable this operation, the buffer construct is transitioned from the closed state to the open state. This enables the task to use the cache to perform the operation.

Methodology

Figure 3:
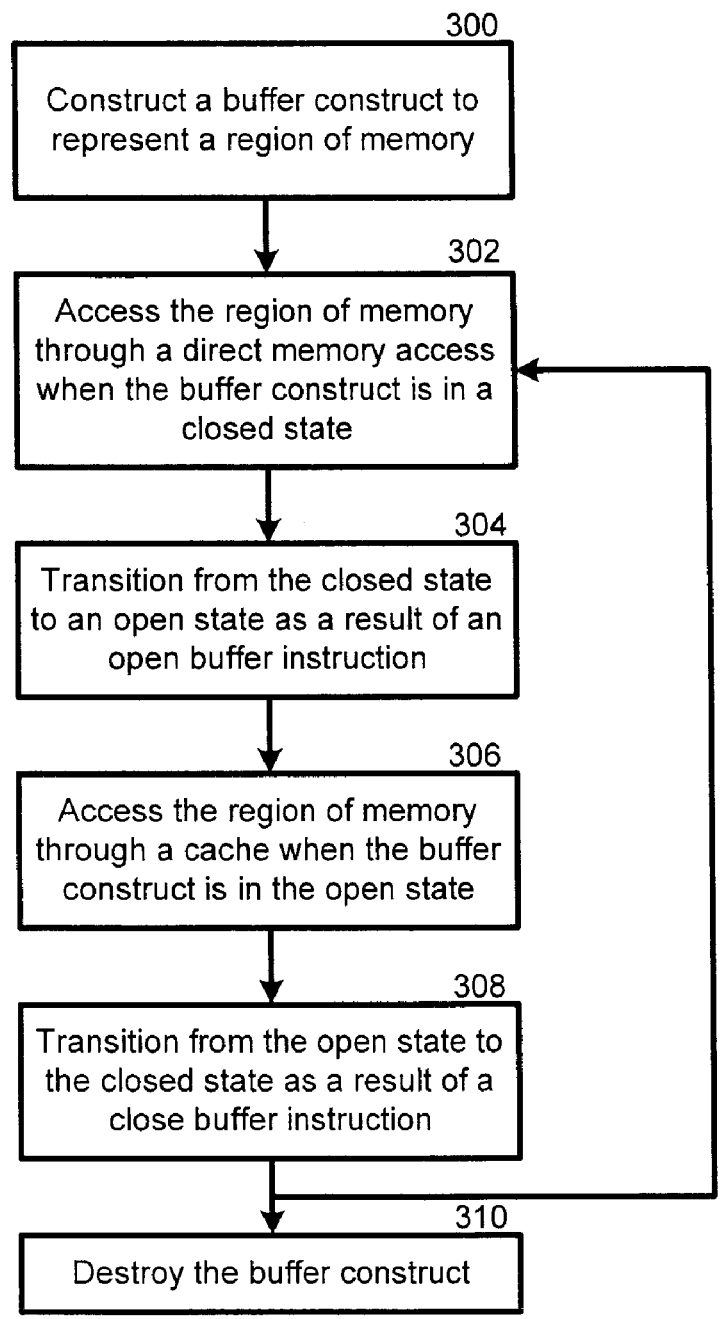
FIG. 3 illustrates a method for managing memory using multiple state buffer representations, under an embodiment.

FIG. 3 illustrates a method for managing memory using multiple state buffer representations, under an embodiment. A method such as described may be implemented programmatically, using components or elements such as described with an embodiment of FIG. 1 or FIG. 5 (hardware). Accordingly, reference is made to elements of FIG. 1 for purpose of illustrating a suitable element or component for performing a step or sub-step being described.

In a step 300, a buffer construct is created with pointers to a region of memory. The buffer construct may be created in connection with performance of a task (or one task in a series of concurrent tasks). Consistent with one or more embodiments, the buffer construct includes state information that controls the use of the buffer construct in connection with DMA or cache operations. As described above, each buffer construct has mutually exclusive states that correspond to different memory access modes. In an embodiment, a buffer construct has at least two mutually exclusive states (an open state and a closed state) for enabling only one of either cache or DMA operations, while precluding the other of the cache or DMA operation.

At step 302, the region of memory is accessed through a DMA operation when the buffer construct is in a closed state. In one embodiment, the buffer construct is in a closed state by default, upon initiation of its creation or use. As mentioned, DMA operations are typically used for high-performance computation and for accessing large amounts of data.

In an embodiment, step 304 provides that the transition of the state of the buffer construct occurs once the task finishes accessing the region of memory through the DMA operation. The logic 130 of the task may transition the state of the buffer construct to the open state.

In one embodiment, the state is transitioned from the closed state to the open state as a result of an open buffer instruction. The open buffer instruction (i) waits for pending or requested DMA operations to complete and (ii) maps the memory. Once the buffer construct transitions from the closed state to the open state, DMA operations are no longer allowed to occur using that buffer construct. The cache is now available to the task when the buffer construct is in the open state, as seen in step 306.

Step 308 provides for the transition of the buffer construct from the open state back to the closed state in response to a close buffer instruction. The close buffer instruction enables the buffer to change state (or switch) from the open state back to the closed state if the task receives instructions to access the region of memory through a DMA operation again. In one embodiment, the close buffer instruction (i) flushes the cache and (ii) unmaps the memory. The task is then precluded from accessing the cache. In one embodiment, both the open buffer instruction and close buffer instruction are explicit function calls that are used to change the buffer construct's state and include all needed synchronization. Once the transition to the closed state is made, the region of memory represented by the buffer construct can be accessed through a DMA back at step 302.

State Diagram

Figure 4:
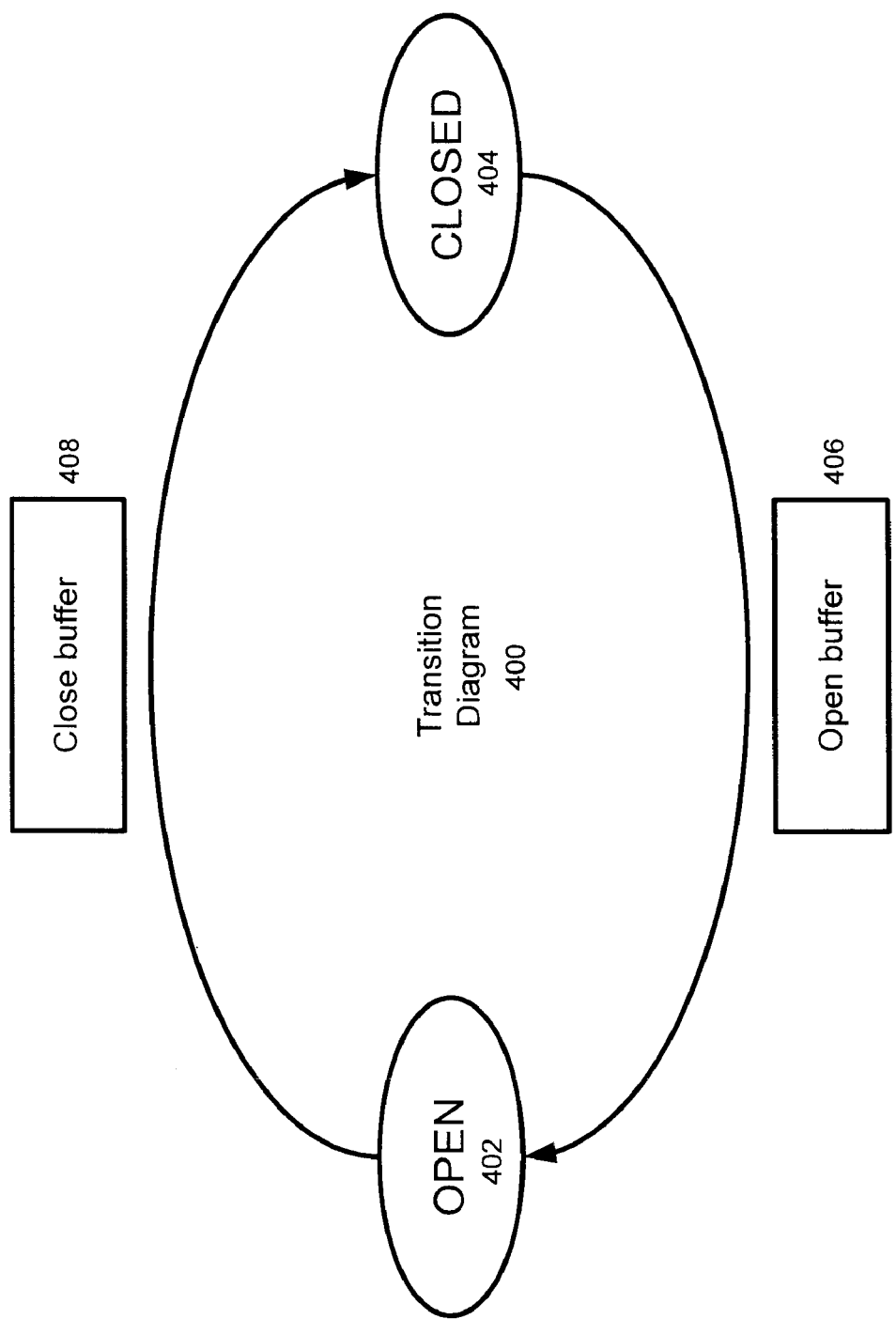
FIG. 4 is a state diagram that illustrates a transition of the states of the buffer construct from open to closed.

FIG. 4 is a state diagram that illustrates a transition of the states of the buffer construct from open to closed. The transition diagram 400 depicts an open state 402, a closed state 404, an open buffer instruction 406 and a close buffer instruction 408. As discussed above, the open buffer instruction 406 waits for the DMA operations that access the memory to complete and maps the memory. Similarly, the close buffer instruction 408 flushes the cache and unmaps the memory.

Software or hardware mechanisms may be employed to prevent, or notify/monitor against memory access operations that are against what is deemed permissible by the state of the buffer construct. For example, referring back to FIG. 2A, if the processor 200 performs DMA operation 204 instead of a cache operation 202 when the buffer construct is in the open state, one implementation provides that the system will produce an easy-to-diagnose error or notification. Similarly, if the processor 200 performs the cache operation 202 instead of a DMA operation 204 when the buffer construct is in the closed state, the system may be configured to produce an error or notification. The error may be detected at the time when the unauthorized DMA or cache operation is attempted. In one embodiment, a program or system implementing a method such as described may record the occurrence by generating an error notification. The system can then notify the user that an error exists.

As an alternative or addition to making an error notification, embodiments may configure the task to wait or sequence its operations based on the state of the buffer construct. Thus, the buffer construct promotes performance of operations in-task that are sequenced to avoid conflict or coherency issues.

Hardware Diagram

Figure 5:
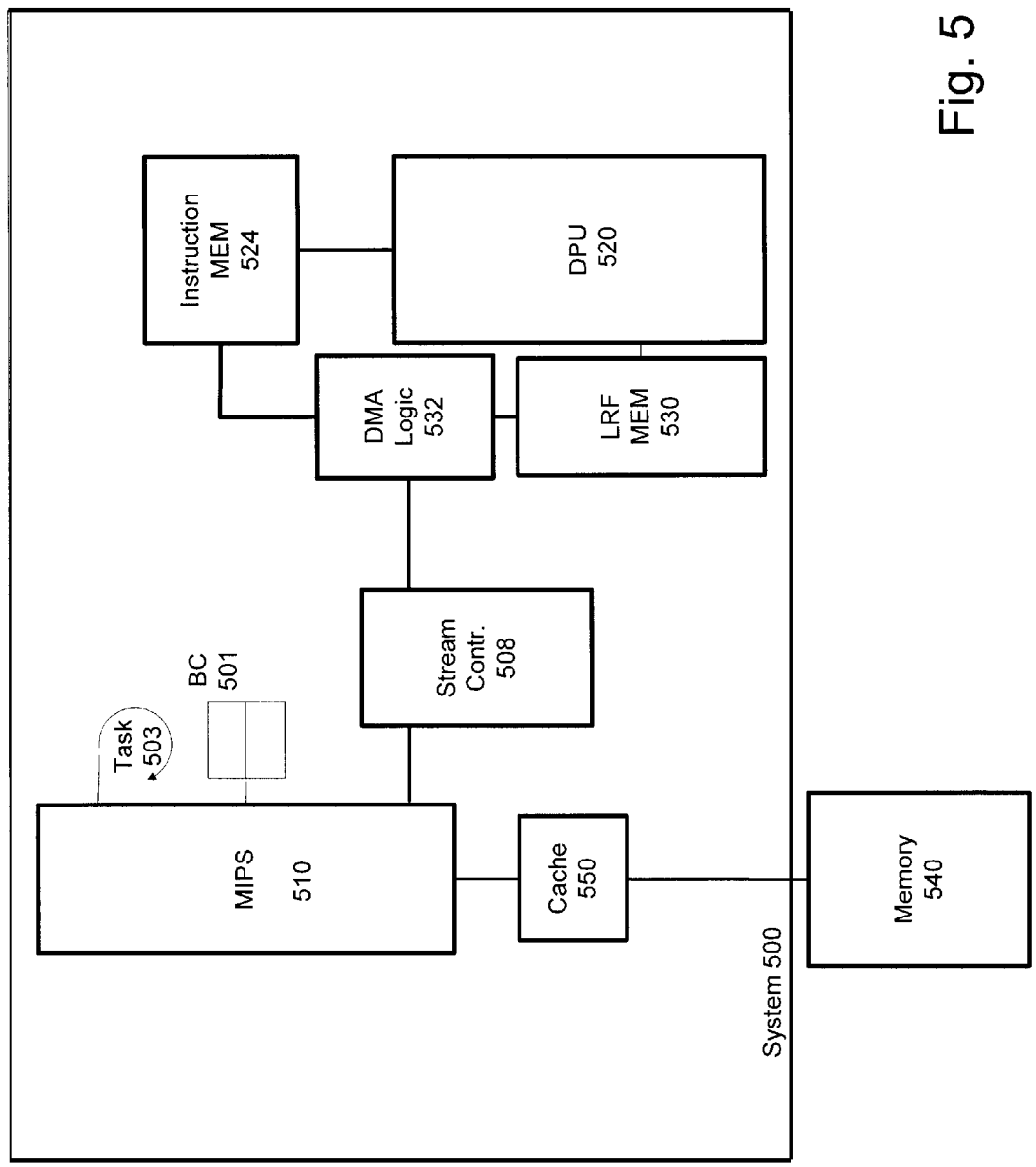
FIG. 5 is a hardware diagram of a system on which one or more embodiments may be implemented.

FIG. 5 is a hardware diagram of a system 500 on which one or more embodiments may be implemented. In an embodiment, the system 500 includes a high-level processor, depicted in FIG. 5 as a MIPS 510, and a processing chip, depicted in FIG. 5 as a DPU 520, on which one or more low-level processing resources are provided. The system 500 operate as part of a larger architecture that includes one or more other MIPS 510' and external memory 540. The memory 540 may correspond to, for example, dynamic RAM, static RAM, Flash memory (including mass storage drive), hard disk device, or any other memory device that is suitable to support memory access operations such as described. A cache 550 may be provided with or as part of system 500. The DPU 520 may include one or more vector processing units, such as SIMD processing elements. The DPU 520 may use a narrow-band memory element, depicted as a lane register file (LRF) element 530, to hold data for processing. An instruction component 524 may also be provided with the DPU 520 to hold instruction data that enables the DPU to configure itself. A logic element 532 may be used to configure the LRF element 530, as a mechanism to manage intake of data to the relatively narrow memory component. The stream controller 508 may be used to queue instructions initiated from the MIPS 510 (i.e., executed by tasks) for how or when the logic element 532 or DPU 520 execute specific operations. The MIPS 510 may also signal instructions for configuring the DPU 520 to the instruction component 524, where the instructions are held until in use.

The system 500 enables transfer of data between external memory 540 and DPU 520 at the control and direction of tasks executing on the MIPS 510. The MIPS 510 may execute tasks which control DMA operations as a mechanism to transfer data from the external memory 540 (which is a large data source) to the LRF element 530 (small data source). To perform DMA operations, the MIPS 510 configures the logic element 532 associated with the DPU 520 to perform the DMA operations. The MIPS 510 may also signal commands to the DPU 520 to perform the DMA operations. The logic element 532, once configured, may communicate with the external memory 540 and the LRF element 530 in order to perform DMA operations. A command path corresponds to instructions that are generated from tasks executing on the MIPS 510 and passed to the DPU 520 and/or LRF element 530 in order to initiate and perform respective DMA operations.

In accordance with embodiments such as described with FIG. 1 through FIG. 4, the MIPS 510 may generate and use the data structure that creates the buffer construct. In one embodiment, a buffer construct 501 is created by task 503, which may be executed with one or more other concurrently performed tasks. The tasks that execute on the MIPS 510 are structured to require use of the buffer construct 501 in order to access data from the external memory 540 when DPU processing or similar operations are needed. The buffer construct 501 may be structured to include pointers and state information, such as described elsewhere in this application.

As described with other embodiments, system 500 may use cache 550 in instances of relatively light data processing operations. The MIPS 510 is configured to maintain a copy of data stored in a portion of the external memory 540 in the cache 550. When a task executes on the MIPS 510 to create the buffer construct 501, the buffer construct 501 may be representative of both the cache 550 and the region of the external memory (from which the cache is provided copy data) that is represented by the buffer construct 501. In this way, the MIPS 510 executes concurrent tasks 503 to perform either cache or DMA operations. As described with one or more other embodiments, the task(s) 503 may be monitored (such as with notification generation), controlled, or precluded from performing cache/DMA operations at instances when conflicts may arise between the contents of the cache and corresponding portions of the external memory 540. The mechanism of control may be provided by the state information of the buffer construct.

CONCLUSION

It is contemplated for embodiments described herein to extend to individual elements and concepts described herein, independently of other concepts, ideas or system, as well as for embodiments to include combinations of elements recited anywhere in this application. Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

What is claimed is:

1. A computer-implemented method to manage memory, wherein the method comprises:
   creating a buffer construct that represents a region of memory, the buffer construct being associated with any one of multiple mutually exclusive states, the multiple exclusive states including an open state and a closed state;
   making the region of memory represented by the buffer construct accessible to one or more DMA operations in response to the buffer construct being in the closed state;
   enabling the buffer construct to transition from the closed state to the open state in response to completion of the one or more DMA operations;
   making the region of memory represented by the buffer construct accessible for use with one or more cache operations in response to the buffer construct being in the open state, so that the one or more cache operations are not in conflict with the one or more DMA operations;
   generating a notification or execution error in response to an occurrence of a DMA operation initiated to the region of memory while the buffer construct is in the open state.

2. The method of claim 1, further comprising transitioning the buffer construct from the open state to the closed state in response to completion of the one or more cache operations.

3. The method of claim 1, further comprising generating a notification or execution error in response to an occurrence of a cache operation to the region of memory while the buffer construct is in the closed state.

4. The method of claim 1, further comprising destroying the buffer construct in response to completion of the one or more DMA operations and while no cache operations are required.

5. The method of claim 1, further comprising making a cache associated with the buffer construct available for use in performing a task, and making the cache available for loading data from the region of memory or storing data to the region of memory.

6. The method of claim 1, further comprising transitioning the buffer construct from the open state to the closed state in response to completion of the one or more cache operations by flushing a cache associated with the represented region of memory and unmapping the cache.

7. The method of claim 1, further comprising transitioning the buffer construct from the closed state to the open state in response to completion of the one or more DMA operations by mapping a corresponding memory region.

8. The method of claim 1, further comprising detecting that all DMA operations to the region of memory have been completed by inspecting a register to make a determination as to whether the DMA operations are complete.

9. A system for managing memory, the system comprising:
   processing resources;
   memory resources, including an external memory, a cache, and a local memory resource for at least a portion of the processing resources;
   wherein a first processing resource is configured to:
   execute a first task;
   create a buffer construct with execution of the first task, the buffer construct including a data structure that includes pointers to a region of memory in the memory resources;
   assign state information to the buffer construct;
   control the first task using the state information based on whether (i) the first task is enabled to perform DMA operations using the external memory while precluding use of the cache, or (ii) the first task is enabled to perform cache operations to the cache while precluding use of the external memory; and
   wherein the first processing resource is configured to detect an error in response to the first task (i) performing a cache operation while the first task is enabled to perform the DMA operations, or (ii) performing a DMA operation while the first task is enabled to perform cache operations.

10. The system of claim 9, wherein the processing resources include a first processor that executes the first task, and a second processor that performs one or more operations at the control of the first processor, wherein the local memory resource is associated with or part of the second processor, and wherein the processing resources are configured to implement the DMA operations to move data between the external memory and the local memory resource.

11. The system of claim 10, wherein the first processor is configured to perform one or more cache operations using the cache and the buffer construct, only while the state information of the buffer construct is assigned to enable the first task to perform the cache operations.

12. The system of claim 10, wherein the first processor is configured to transition the state information of the buffer construct to preclude performance of the cache operations by the first task and enable performance of the DMA operations in response to completion of pending or requested cache operations.

13. The system of claim 10, wherein the first processor is configured to transition the state information of the buffer construct to preclude performance of the DMA operations by the first task and enable performance of the cache operations in response to completion of pending or requested DMA operations.

14. The system of claim 12, wherein the first processor is configured to transition the state information of the buffer construct to preclude performance of the cache operations by unmapping the external memory.

15. The system of claim 13, wherein the first processor is configured to transition the state information of the buffer construct to preclude performance of the DMA operations by mapping the external memory.

16. The system of claim 9, wherein the first processing resource is configured to generate an error notification in response to detection of the error.

17. A computer-implemented method to manage memory, wherein the method comprises:
   creating a buffer construct that represents a region of memory, the buffer construct being associated with any one of multiple mutually exclusive states, the multiple exclusive states including an open state and a closed state;
   making the region of memory represented by the buffer construct accessible to one or more DMA operations in response to the buffer construct being in the closed state;
   enabling the buffer construct to transition from the closed state to the open state in response to completion of the one or more DMA operations;

making the region of memory represented by the buffer construct accessible for use with one or more cache operations in response to the buffer construct being in the open state, so that the one or more cache operations are not in conflict with the one or more DMA operations;

generating a notification or execution error in response to an occurrence of a cache operation to the region of memory while the buffer construct is in the closed state.

* * * * *